United States Patent
Sachs et al.

(10) Patent No.: US 6,331,865 B1
(45) Date of Patent: Dec. 18, 2001

(54) METHOD AND APPARATUS FOR ELECTRONICALLY DISTRIBUTING AND VIEWING DIGITAL CONTENTS

(75) Inventors: James Sachs, Menlo Park; Thomas W. Pomeroy, Atherton; Aleksey Novicov, Palo Alto; Garth Conboy; Erik Walter, both of La Jolla; William S. Leshner; Brady Duga, both of Carlsbad; Richard Wotiz, Saratoga, all of CA (US)

(73) Assignee: Softbook Press, Inc., Menlo Park, CA (US)

( * ) Notice: Subject to any disclaimer, the term of this patent is extended or adjusted under 35 U.S.C. 154(b) by 0 days.

(21) Appl. No.: 09/173,975

(22) Filed: Oct. 16, 1998

(51) Int. Cl.[7] .................................................. G06F 3/00
(52) U.S. Cl. ..................... 345/776; 345/741; 345/748; 707/513; 709/217
(58) Field of Search ............................... 345/350, 339, 345/348, 349, 351, 329, 331; 709/217, 219

(56) References Cited

U.S. PATENT DOCUMENTS 5,799,157 * 8/1998 Escallon ............................. 395/227
5,819,032 * 10/1998 De Vries et al. .................... 345/326

(List continued on next page.)

FOREIGN PATENT DOCUMENTS 0 760 505 A   3/1997   (EP) ............................. G06F/17/60
0 821 315 A   1/1998   (EP) ............................. G06F/17/30

(List continued on next page.)

OTHER PUBLICATIONS

Schilit B. N. et al., "Beyond Paper: Supporting Active Reading with Free Form Digital Ink Annotations:" CHI Conference Porceedigns. Human Factors in Computing Systems, US, New York p 249–256: ACM, 1998, pp. 249–256, XP000780797 ISBN: 0–89791–975–0; p. 249, left–hand col.—p. 250, left–hand col., p. 254, right–hand col.

Hakozaki et al., "Conceptual Design of a Virtual Library for Personal Use:" Systems & Computers in Japan, US, Scripta Technica Journals, New York, vol. 30,, No. 3, Mar. 1999 (1999–03), pp. 43–51, XP000831491 p. 47, left–hand col. line 17—p. 48, right–hand col., line 8 p. 44, left–hand col., line 19—right–hand col., line 44 figures 1,4 & Denshi Joho Tsushin Gakkai Ronbunshi, vol. J81–D–11, No. 5, May 1998 (1998–05), pp. 1025–1034.

* cited by examiner

Primary Examiner—Raymond J. Bayerl
Assistant Examiner—Cuong T. Thai
(74) Attorney, Agent, or Firm—Townsend and Townsend and Crew LLP

(57) ABSTRACT

The present invention is a method and system for electronically distributing digital contents. The digital contents include textual, graphical and pictorial information. At least one portable electronic book is operative to request a digital content from a catalog of distinct digital contents, to receive and display the requested digital content in readable form. An information services system is in electrical communication with the portable electronic book to perform authentication and rendering the requested digital content. An authentication server authenticates the identity of the requesting portable electronic book. A copyright protection server renders the requested digital content sent to the requesting portable electronic book readable only by the requesting portable electronic book. At least one primary virtual bookstore is in electrical communication with the information services system. The primary virtual bookstore is a computer-based storefront accessible by the portable electronic book. The primary virtual bookstore includes the catalog of distinct digital contents and a repository which stores the distinct digital contents listed in the catalog.

43 Claims, 2 Drawing Sheets

U.S. PATENT DOCUMENTS

| | | | |
|---|---|---|---|
| 5,909,690 | * | 6/1999 | Tanigawa et al. ............... 345/350 |
| 5,956,034 | * | 9/1999 | Sachs et al. ............... 345/350 |
| 5,957,697 | * | 9/1999 | Iggulden et al. ............... 345/350 |
| 6,108,703 | * | 8/2000 | Leighton et al. ............... 709/226 |
| 6,125,388 | * | 9/2000 | Reisman ............... 345/333 |
| 6,134,591 | * | 10/2000 | Nickles ............... 709/229 |

FOREIGN PATENT DOCUMENTS

| | | | | |
|---|---|---|---|---|
| 0821315 A1 | * | 1/1998 | (EP) . | |
| WO 97 22109 A | | 6/1997 | (WO) | ............... G09G/5/00 |
| WO 98 08344 A | | 2/1998 | (WO) . | |
| WO 98 18086 A | | 4/1998 | (WO) | ............... G06F/17/30 |

METHOD AND APPARATUS FOR ELECTRONICALLY DISTRIBUTING AND VIEWING DIGITAL CONTENTS

BACKGROUND OF THE INVENTION

1. Field of the Invention

The present invention relates generally to a distribution system of digital contents, i.e., digitally encoded published materials, and more particularly, to a digital content distribution system and method which are capable of preventing unauthorized subsequent distribution of the digital contents.

2. Description of Related Art

The rapid growth of computer and communication technologies has facilitated business transactions in a number of ways. One particular area of business transactions in the electronic commerce. Consumers can now conduct commercial transactions with business entities conveniently and efficiently over the communication networks such as the Internet. One particular area of electronic commerce is information retrieval. Examples of information retrieval include electronic books, personal digital assistants, etc.

Business transactions involving information retrieval devices (e.g., electronic books) present a number of difficulties. The transaction should be efficient, reliable, confidential, secure, and convenient. From a business standpoint, the transaction should also be profitable and provides mutual benefits for both the consumers and the business operators.

Accordingly, it is desirable to have a method and system to operate an information distribution network to distribute digital contents to consumers for viewing.

SUMMARY OF THE INVENTION

The present invention is a method and system for electronically distributing digital contents. The digital contents include textual, graphical and pictorial information. At least one portable electronic book is operative to request a digital content from a catalog of distinct digital contents, to receive and display the requested digital content in readable form. An information services system is in electrical communication with the portable electronic book to perform authentication and rendering the requested digital content. An authentication server authenticates the identity of the requesting portable electronic book. A copyright protection server renders the requested digital content sent to the requesting portable electronic book readable only by the requesting portable electronic book. At least one primary virtual bookstore is in electrical communication with the information services system. The primary virtual bookstore is a computer-based storefront accessible by the portable electronic book. The primary virtual bookstore includes the catalog of distinct digital contents and a repository which stores the distinct digital contents listed in the catalog.

In one embodiment of the invention, the system further comprises a secondary virtual bookstore in electrical communication with the information services system. In this case, the information services system also includes a directory of virtual bookstores to provide the portable electronic book with access to the secondary virtual bookstore and its catalog of digital contents.

The information services system also includes a registration server for keeping track of the active state of the account associated with each portable electronic book in the system and for ensuring that each portable electronic book is associated with a primary virtual bookstore in the system.

The information services system further comprises a centralized bookshelf for each portable electronic book in the system. Each centralized bookshelf contains all digital contents sent to and owned by the corresponding portable electronic book. Each portable electronic book can permanently delete any of the owned digital contents from the associated centralized bookshelf.

The information services system further comprises an Internet Services Provider for providing Internet network access to each portable electronic book in the system.

The information services system can optionally include a notice board server for sending messages from the primary virtual bookstore and/or the secondary virtual bookstore to a portable electronic book in the system.

DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

The present invention is a system and a method for electronically distributing digital contents, which include textual, graphical and pictorial information. The invention provides copyright protection for the digital contents that are copyrighted materials.

Figure 1:
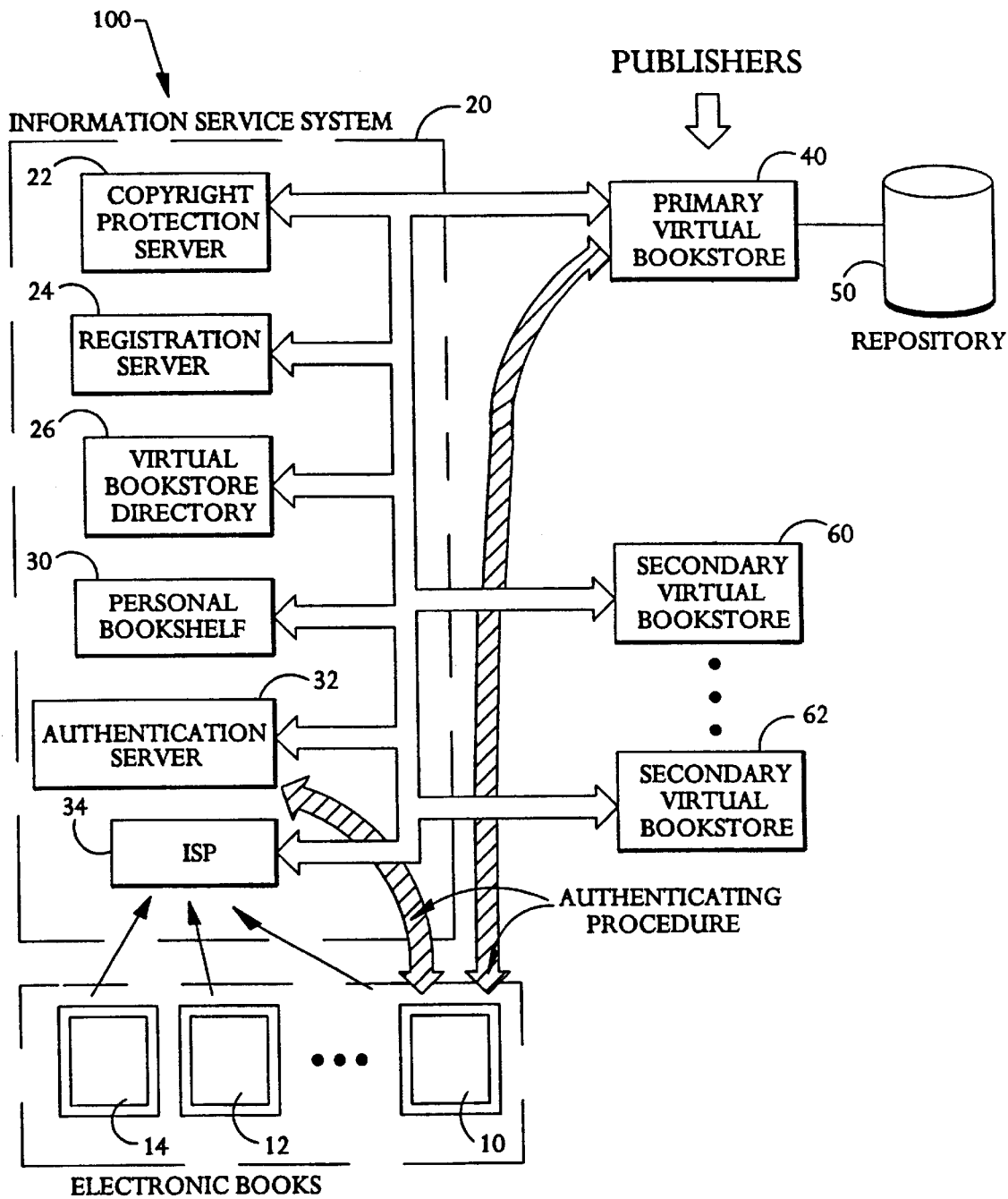
FIG. 1 is a block diagram illustrating the system of the present invention.

Referring to FIG. 1, the system comprises: (a) at least one portable electronic book 10 operative to request a digital content from a catalog of distinct digital contents, to receive and display the requested digital content in readable form; (b) an information services system 20 which includes an authentication server 32 for authenticating the identity of the requesting portable electronic book 10 and a copyright protection server 22 for rendering the requested digital content sent to the requesting portable electronic book 10 readable only by the requesting portable electronic book 10; (c) at least one primary virtual bookstore 40 in electrical communication with the information services system 20, the primary virtual bookstore being a computer-based storefront accessible by the portable electronic book and including the catalog of distinct digital contents; and (d) a repository 50, in electrical communication with the primary virtual bookstore 40, for storing the distinct digital contents listed in the catalog.

The system preferably includes more than one portable electronic book 10, to be commercially viable. This is illustrated in FIG. 1 by including the portable electronic books 12 and 14. The system also preferably includes more than one primary virtual bookstore 40, each serving a different set of customers, each customer owning a portable electronic book.

In one embodiment of the invention, the system further comprises a secondary virtual bookstore 60 in electrical communication with the information services system 20. In this case, the information services system 20 also includes a directory of virtual bookstores 26 in order to provide the portable electronic book 10 with access to the secondary virtual bookstore 60 and its catalog of digital contents.

The information services system 20 can optionally include a notice board server for sending messages from one of the virtual bookstores, primary or secondary, to a portable electronic book in the system.

The information services system 20 also includes a registration server 24. The registration server automatically configures an electronic book for a first time user. All required information for activation of the electronic book is stored in a database accessible by the registration server 24 and the authentication server 32. The registration server 24 also keeps track of the portable electronic books that are considered active accounts in the system and for ensuring that each portable electronic book is associated with a primary virtual bookstore in the system. In the case where the optional notice board server is included in the information services system 20, the registration server 24 also allows each portable electronic book user to define his/her own notice board and document delivery address.

The information services system 20 preferably comprises a centralized bookshelf 30 associated with each portable electronic book 10 in the system. Each centralized bookshelf 30 contains all digital contents requested and owned by the associated portable electronic book 10. Each portable electronic book 10 user can permanently delete any of the owned digital contents from the associated centralized bookshelf 30. Since the centralized bookshelf 30 contains all the digital contents owned by the associated portable electronic book 10, these digital contents may have originated from different virtual bookstores. The centralized bookshelf 30 is a storage extension for the portable electronic book 10. Such storage extension is needed since the portable electronic book 10 has limited non-volatile memory capacity.

The user of the portable electronic book 10 can add marks, such as bookmarks, inking, highlighting and underlining, and annotations on a digital content displayed on the screen of the portable electronic book, then stores this marked-up digital content in the non-volatile memory of the electronic book 10. The user can also upload this marked-up digital content to the information services system 20 to store it in the centralized bookshelf 30 associated with the portable electronic book 10, for later retrieval. The uploading can also be made transparent to the user. In other words, the electronic book 10 can upload mark-ups into the remote bookshelf 30 when it is appropriate. There is no need to upload any unmarked digital content, since it was already stored in the centralized bookshelf 30 at the time it was first requested by the portable electronic book 10.

The functions of the bookshelf 30 and the copyright protection server 22 are tightly coupled. Therefore, all related information for these two functions are contained in a single database.

The information services system 20 further includes an Internet Services Provider 34 for providing Internet network access to each portable electronic book in the system.

Authentication

The authentication server provides client authentication for the entire system of FIG. 1. Every time an electronic book user navigates to a virtual bookstore, the authentication server must be called upon, via HTTP, to do the following: authenticate the connecting electronic book as a valid electronic book, authenticate to the electronic book that the authentication server is valid, establish a unique session key between the electronic book and the current virtual bookstore, record when the electronic book user logged in.

To ensure a secure system for content purchase and delivery, each electronic book contains a unique secret key. The authentication server 32 is the only one in the system 100 entrusted with maintaining a database of those secret keys.

The secret keys are used for a double random number exchange which validates the authenticity of one connecting entity to the other. Once this has been established, a session key is created which is securely related to the virtual bookstore by the authentication server 32. When related to the virtual bookstore, the session key is encrypted by the bookstore secret key which is known only to the bookstore and the authentication server 32.

If the electronic book fails to properly authenticate, access to the network will be denied and the user will be asked to call a customer support number.

The authentication server can also determine whether a particular electronic book requires a Programmable Read Only Memory (PROM) update. If so, the user will be asked whether the user would like to do the PROM update at that moment and informed of how long it will take. If the user does not choose to do the update, the user will be asked again later. If the user chooses to do a PROM update, the PROM image is downloaded into the electronic book, the connection is dropped, and the electronic is reprogrammed.

Copyright Protection

There are types of digital contents: persistent contents and ephemeral contents. The details of a transaction between a portable electronic book and a virtual bookstore are different for the two types of contents, because they are treated differently by the copyright protection server At the beginning of any session between a virtual bookstore and the portable electronic book 10, the portable electronic book 10 is authenticated by the authentication server 32. The authentication server 32 then generates a secret session key which is known by the virtual bookstore, the portable electronic book 10 and the corresponding centralized bookshelf 30.

Persistent content.

Scenario 1: the portable electronic book 10 purchases a persistent digital content from the primary virtual bookstore 40.

The distinct persistent digital contents stored in the repository 50 are compressed and encrypted with unique content keys, one unique content key for each distinct digital content. A symmetric encryption algorithm may be used for this encryption. In one embodiment of the invention, content keys are implemented with DES keys. The compression, which must be performed before the encryption, can be done with an industry standard compression algorithm, such as the LZSS, a variant of the LZ77.

The virtual bookstore 40 maintains a list of all the content keys associated with the distinct digital contents stored in the repository 50, as part of the virtual bookstore 40 database of portable electronic book users and assets.

When a digital content is purchased by the portable electronic book 10 user, a secure digital envelope is formed by encrypting the content key with the session key. Then, the virtual bookstore 40 transmits to the centralized bookshelf 30 the identification number of portable electronic book 10, the URL of the digital content and the secure digital envelope.

At the centralized bookshelf 30, the received digital envelope is decrypted with the session key to obtain the content key. The content key is then encrypted with the unique secret key of the portable electronic book 10. The resulting content key is then stored, along with the URL of the purchased digital content, in the centralized bookshelf 30. This allows the electronic book 10 user to retrieve the content anytime directly from the centralized bookshelf 30.

Once the digital content has been purchased, the portable electronic book 10 user may choose to download the purchased digital content while the portable electronic book 10 is still connected to the virtual bookstore 40. In this case, the content key associated with the purchased digital content is encrypted with the session key. The resulting encrypted content key is then sent along with the digital content, which is downloaded out of the repository 50, to the portable electronic book 10.

At the portable electronic book 10, the received encrypted content key is decrypted with the session key, which is already known to the portable electronic book 10. The decrypted content key is then re-encrypted with the electronic book secret key, and stored with the compressed and encrypted digital content. When the purchased digital content is to be displayed, the portable electronic book 10 decompresses the digital content and uses the content key to decrypt the decompressed content.

Ephemeral Content Scenario 2: the electronic book 10 purchases an ephemeral content.

Ephemeral contents are contents that are not stored permanently in a repository of a virtual bookstore. It can be stored in any format. It is converted to a hypertext language used by the system 100 of FIG. 1 in real time. There is no content key for an ephemeral content.

When the electronic book purchases an ephemeral content, the ephemeral content is encrypted with the session key. Thus, the session key is used as a content key in this case.

Once the ephemeral content has been purchased, the portable electronic book 10 user may choose to download the purchased digital content while the portable electronic book 10 is still connected to the virtual bookstore 40. If so, the content is downloaded out of the repository, encrypted with the session key.

When the ephemeral content is purchased, the virtual bookstore transmits to the centralized bookshelf the electronic book identification number and the ephemeral content which is encrypted with the session key. The session key is then encrypted with the electronic secret key and stored along with the purchased ephemeral content.

If the electronic book 10 user chooses to down load the content, whether persistent or ephemeral content, immediately after purchase, the content is simultaneously downloaded into the electronic book 10 and placed into the centralized bookshelf 30. The mechanism of storing the content into the bookshelf 30 is an independent process, i.e., asynchronous and out-of-band, from the actual download of the content.

In addition to storing either ephemeral content or a reference to a persistent content in the form of a URL address, the bookshelf 30 stores the following items with each piece of content the content key (for persistent content) or the session key (for ephemeral content) encrypted with the electronic book unique secret key, a category name for the content which is used to group contents in both the local personal library and the centralized bookshelf, user markups including highlighting, inking, and annotations, and the price paid for the content.

An electronic book can retrieve content from the centralized bookshelf anytime, for as long as the electronic book has an active status.

Any content placed into the bookshelf 30 which has never been downloaded into the corresponding electronic book 10 will appear in a special category at the front of the remote bookshelf 30 called "New Content". Once the content has been downloaded, the content is moved to the appropriate category.

Secure Ordering

Any order information sent from the Bookstore to the electronic book must be encrypted with the session key. Secure information is indicated by the custom "TYPE" attribute within the <HTML> tag as:

<HTML TYPE=secure>

Any subsequent information up to the </HTML> tag is encrypted with the session key. Within the encrypted text stream there must be an anchor tag with the custom TYPE attribute that is used to approve the order. It is of the form:

<A TYPE=secure HREF=
       "URL?PRICE_PAID=xxx.xx&ORDER=">

Upon seeing this special attribute, the electronic book knows to respond with an order ID, encrypted with the session key, inserted immediately after the "=" sign. The order ID is a random number generated by the electronic book.

The bookstore passes the order ID to the bookshelf together with the content key(s), all encrypted with the session key. The order ID and corresponding price paid is then passed from the electronic book to the Authentication server the next time the electronic book connects either to another bookstore or to the virtual bookstore network. The order ID is used by the electronic book information service to reconcile all transactions. This ensures that fraudulent orders can be detected, and also provides a mechanism for verifying third party bookstore revenue volume.

For the electronic book user to feel confident that a particular transaction is secure and not being spoofed, some visual indication should be given by the electronic book which cannot be replicated by HTML. This is a similar concept to the lock/unlock symbol for secure HTTP links.

Electronic Book

Figure 2:
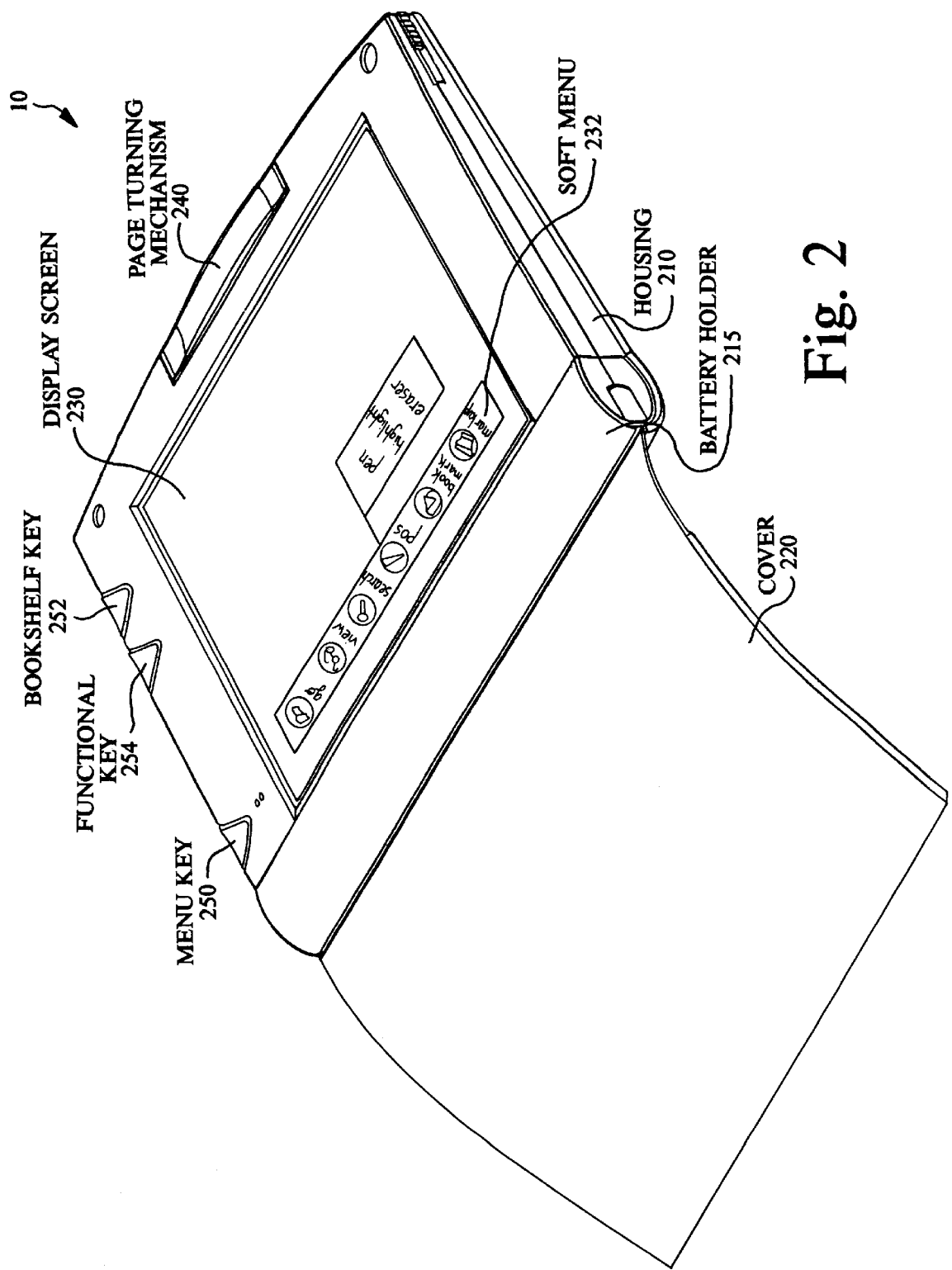
FIG. 2 is a viewing device according to one embodiment of the present invention.

FIG. 2 is a diagram illustrating an electronic book according to one embodiment of the present invention. The electronic book 10 includes a housing 210, a battery holder 215, a cover 220, a display screen 230, a page turning mechanism 240, a menu key 250, a bookshelf key 252, and a functional key 254.

The housing 210 provides overall housing structure for the electronic book. This includes the housing for the electronic subsystems, circuits, and components of the overall system. The electronic book is intended for portable use; therefore, the power supply is mainly from batteries. The battery holder 215 is attached to the housing 210 at the spine of the electronic book 10. Other power sources such as AC power can also be derived from interface circuits located in the battery holder 215. The cover 220 is usually made by flexible material and is attached to the housing 210. The cover is used to protect the viewing area 230.

The display screen 230 provides a viewing area for the user to view the digital contents retrieved from the storage devices or downloaded from the communication network. The display screen may be sufficiently lit so that the user can read without the aid of other light sources. When the electronic book is in use, the user interacts with the electronic book via a soft menu 232. The soft menu 232 displays icons allowing the user to select functions. Examples of these functional icons include go, views, search, pens, bookmarks, markups, and close. Each of these icons may also include additional items. These additional items are displayed in a drop-down tray when the corresponding functional icon or key is activated by the user. An example of a drop-down tray is the pens tray which includes additional items such as pen, highlighter, and eraser. In one embodiment, the soft menu 232 can be updated dynamically and remotely via the communication network.

The page turning mechanism 240 provides a means to turn the page either backward or forward. The page turning mechanism 240 may be implemented by a mechanical element with a rotary action. When the element is rotated in one direction, the electronic book will turn the pages in one direction. When the element is turned in the opposite direction, the electronic book will also turn in the opposite direction. In one embodiment, the page turner mechanism 240 may also be used as a latch to hold the cover 220 in place when the electronic book is closed.

The menu key 250 is used to activate the soft menu 232 and to select the functional icons. The bookshelf key 255 is used to display the contents stored in the bookshelf and to activate other bookshelf functions. The functional key 254 is used for other functions.

Each electronic book is initially programmed at the manufacturing factory with four essential values: a serial number, a secret key, a primary bookstore address, initially set to the registration server's address (for example, its Web address), a nationwide toll-free phone number for initial connection to the virtual bookstore network.

The list of electronic book serial numbers and associated secret keys are recorded at the factory and stored in an encrypted manner by a configuration software application. A single list represents all of the electronic books built in a particular manufacturing run for a particular day. This encrypted list is sent to the information services system 20 electronically using secure web-based administration software.

The electronic book serial numbers and secret keys are automatically added to the database of the authentication server and the registration server, along with the manufacturing date and the manufacturer's name. The serial numbers and secret keys are also added to the database which provides centralized control for point-to-point protocol (PPP) dial-in access. The common database of the authentication server and the registration server can be set up to function as the database which provides centralized control for PPP dial-in access.

Business Model

The virtual Bookstore Network is based on the assumption of a specific business model. The business model assumes that there are two profit/loss business entities, both of which can establish a recurring revenue business to whatever extent they choose. Selecting a business model which includes a recurring revenue component is crucial in getting the initial cost of a electronic book below a reasonable retail price.

The first entity is original business entity, and the recurring revenue component is derived from providing copyright protection services in the form of secure digital envelopes. Secure digital envelopes, which are used to protect copyrighted content, are the cornerstone of the virtual bookstore network. This service is provided solely by original business entity and is implemented by the copyright protection server. The market potential for recurring revenue for original business entity is limited only by:

Number of electronic books×Number of content sales per electronic book

The second entity is the virtual bookstore, and the recurring revenue component is derived from the sale of digital content. This service is provided by a multiple number of content vendors, one of which would be original business entity. original business entity may also provide services to content vendors to host their virtual bookstore. The market potential for a virtual bookstore is limited only by:

Number of titles×Number of sales per title

There is a very strong impetus for developing a business model which encourages and promotes multiple virtual bookstore vendors. Creating a free market environment for virtual bookstores ensures that the electronic book market will grow rapidly without the risk of original business entity becoming a bottleneck. Providing third party vendors with strong business opportunities accelerates the much needed inventory of electronic book- compatible content. This will benefit the original business entity in the long run as the demand for original business entity products grows. These products will include:

Electronic books

Content copyright protection services

Virtual bookstore franchise licenses

Content conversion tools

Bookstore directory services

Bookstore hosting services

The original business entity customers are solely the content vendors who run and operate a bookstore, and have the rights to content to sell. Content vendors purchase electronic books from original business entity, typically at cost plus a small margin, since original business entity will generate additional recurring revenue from its copyright protection services. If a particular content vendor does not expect to utilize the copyright protection services, then the cost of electronic books to the content vendor will include a more reasonable margin.

The content vendor is expected to sell electronic books to its customer base at below cost, making up the loss of margin through recurring transactions of content sales.

Electronic book customers are in no way limited to purchasing content from only one virtual bookstore. They have the freedom to purchase any content from any virtual bookstore, unless there exists a virtual bookstore which desires to sell only a subset of their content to "outside" electronic book customers. A typical example may be a department, school or college in a university, which may restrict a subset of their content only to electronic book customers that are current students or alumni.

It is envisioned that the number of virtual bookstores that exist will be determined by market pressures. It is quite possible that the early market may expand to a large amount of virtual bookstores, and that the mature market may see a consolidation that results in only a few bookstores. The market will also see the evolution of a new flavor of virtual bookstore called a secondary bookstore.

Primary Bookstore—Typically own and produce the content they sell.

Sell content to their own electronic book customer base.

Secondary Bookstore—Aggregate content from other publishers.

Sell content to the installed electronic book customer base.

System Components

There are four major components which make up the network architecture for virtual bookstores:

1. Electronic book—a portable device capable of rendering HTML-based content. The electronic book is deemed a secure entity.

2. Virtual bookstore—a Web-based storefront which also includes a content repository. With regards to content, virtual bookstores are not treated as a secure entity.

3. Repository—storage facility for electronic book content on the Internet, typically a component of a virtual bookstore. This is not a secure entity.

4. Copyright protection server—transaction-based service operated by the original business entity. The original business entity acts as a "trusted agent" for content publishers to ensure content is only readable by legitimate customers, and cannot be redistributed. This is deemed to be a secure entity.

A single electronic book user connects to a specific bookstore using standard dial-in PPP access points with the standard original business entity ISP. electronic book users can choose to browse other bookstores in the network by accessing the original business entity directory. The original business entity directory, maintained by original business entity, is an on-line catalog of all bookstores in the original business entity network. This directory is accessible from any virtual bookstore and includes powerful search capabilities.

Repositories store electronic book content that is sold through a virtual bookstore. Typically, a content repository is a module within a virtual bookstore. Future evolution of the virtual bookstore may have the repository as an independent function and business entity.

Bookstores are storefronts which sell content stored in the bookstore's repository. Virtual bookstores function as independent profit centers.

The copyright protection server provides services to any virtual bookstore which wants to protect its content against piracy and illegal distribution.

Virtual Bookstores

There are 2 classes of bookstores: primary and secondary. The primary bookstore is distinguished from a secondary bookstore in that a primary bookstore has a predefined relationship with an aggregate of end users with similar content needs, while a secondary bookstore has a relationship only with the general installed base of electronic book customers. The characteristics that make up the relationship between a electronic book customer and a primary bookstore are:

1. When connecting to the virtual bookstore network, a electronic book customer is connected directly to their primary virtual bookstore. electronic book customers can connect to secondary bookstores only through the original business entity directory in their primary bookstore.

2. A primary bookstore maintains user account information for billing purposes.

3. A primary bookstore may have subsidized the cost of the electronic books for its customer base.

4. A primary bookstore maintains a personal library for the electronic book customers for all content purchased by that customer, regardless of which bookstore that content was purchased from. It is a crucial requirement to have all records of content purchased by a single electronic book user resident within one single personal library.

5. A primary bookstore maintains a local repository for storing personal documents forwarded to a particular electronic book customer.

6. A primary bookstore charges a monthly access fee to its electronic book customers to cover monthly operating expenses, and network access fees paid to the original business entity.

Note that any virtual bookstore that an electronic book user goes to that is not the electronic book user's primary bookstore, is treated as a secondary bookstore whether or not it is a primary or secondary bookstore.

Bookstores function as independent profit centers. Both primary and secondary bookstores generate revenue from reselling content. Primary bookstores also generate revenue from the sale of electronic books and monthly access fees.

Bookstore expenses include monthly operation fees and startup licensing fees paid to original business entity. Primary bookstores have an additional monthly maintenance fee paid to the original business entity, on a per electronic book user basis, for network access.

Margin for content sold by a secondary bookstore is split between the electronic book user's primary bookstore and the secondary bookstore. This credits the sale of the content to the secondary bookstore, and credits the sales transaction processing to the primary bookstore. This is required since only the primary bookstore maintains account information for the electronic book user.

When content is purchased from a primary bookstore by a electronic book customer that is affiliated with a different primary bookstore, the bookstore selling the content functions as if it was a secondary bookstore. In other words, primary bookstores can operate as secondary bookstores, but not vice versa.

Network Access

Dial-up PPP using a nationwide ISP will provide network access for all electronic book customers. It is expected that network access fees will be low since original business entity will contract with an ISP to provide bulk Internet access.

Toolkits

The original business entity will provide a number of toolkits for content vendors. Some or all of these toolkits may form the basis of a franchise business which generates revenue for original business entity. The toolkits will include:

Virtual bookstore Toolkit—Includes all of the software modules to set up a storefront, a content repository, billing systems, and access to the copyright protection services.

Content Conversion Toolkit—Includes all of the tools to repurpose digital content for the electronic book. The final content output is encrypted, and the encryption key is sealed in a secure digital envelope using the original business entity public key.

Bookstore Types

There are two types of virtual bookstores: electronic book press (EBP)-Hosted bookstores and third party bookstores. A particular instance of a EBP-Hosted bookstore is the electronic bookstore. EBP-Hosted bookstores are hosted by electronic book press, but administered by a bookstore licensee (in version 1.0 all administration will be performed by electronic book press). Hosting means that electronic book press provide the computer hardware and ongoing maintenance to keep that hardware running. Administering means that the bookstore licensee sets the content pricing, adds new content to the bookstore, markets promotions of specific content, and controls who has access to the bookstore. Content within a EBP-Hosted bookstore is provided and aggregated by the bookstore licensee. As part of the service of a EBP-Hosted bookstore, electronic book press performs all of the (credit card) billing for the bookstore licensee for all content purchases. A typical EBP-Hosted bookstore will have some level of brand name recognition in either a vertical or broad marketplace.

In the case of the electronic bookstore, electronic book press aggregates the content and administers the bookstore. electronic book press pays royalties to the respective copyright holders of all of the content sold in this bookstore.

The third party bookstore licensee completely hosts and operates their own virtual bookstore, using all of their own equipment (other than the dial-in routers), and pays electronic book press a percentage of the monthly revenue volume. This monthly fee covers the use of the electronic book information services, and the license to operate a virtual bookstore.

| electronic bookstore hosted by electronic book press administered by electronic book press | EBP-Hosted bookstore hosted by electronic book press administered by bookstore licensee (electronic book press for vers. 1.0) | Third party bookstore hosted by bookstore licensee administered by bookstore licensee |
|---|---|---|
| content sales revenue goes to electronic book press royalties paid to content provider | content sales revenue goes to electronic book press royalties paid to bookstore licensee | content sales revenue goes to bookstore licensee revenue-based license fees paid to electronic book press |

Electronic Book Services
Bookstore List

The electronic book services catalog is a dynamic list of all of the virtual bookstores in the virtual bookstore network. If the electronic book user's primary bookstore is the electronic bookstore, then the electronic book services catalog lists only the electronic bookstore and the customer support bookstore. None of the vertical bookstores are displayed.

If the electronic book user's primary bookstore is a vertical bookstore, then the electronic book services catalog lists the vertical bookstore, the electronic bookstore, and the customer support bookstore. None of the other vertical bookstores are displayed.

If a electronic book user's primary bookstore is a vertical bookstore, they will be able to browse the content in the electronic bookstore, but they may be restricted by their vertical bookstore from purchasing content from the electronic bookstore. This kind of a restriction would apply to all electronic book users of a particular vertical bookstore.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for electronically distributing digital contents, the digital contents including textual, graphical and pictorial information, the system comprising:
    at least one portable electronic book, the portable electronic book operative to request a digital content from a catalog of distinct digital contents, to receive and display the requested digital content in readable form;
    an information services system, in electrical communication with the portable electronic book, the information services system comprising:
        an authentication server for authenticating the identity of the requesting portable electronic book; and
        a copyright protection server for rendering the requested digital content sent to the requesting portable electronic book readable only by the requesting portable electronic book ensuring the digital content cannot be redistributed;
    at least one primary virtual bookstore in electrical communication with the information services system, the primary virtual bookstore being a computer-based storefront accessible by the portable electronic book, the primary virtual bookstore including:
        the catalog of distinct digital contents; and
        a repository, in electrical communication with the primary virtual bookstore, for storing the distinct digital contents listed in the catalog.

2. The system of claim 1 further comprising a secondary virtual bookstore in electrical communication with the information services system, the secondary virtual bookstore including a second catalog of distinct digital contents.

3. The system of claim 2 wherein the information services system further comprises a directory server, said directory server providing the portable electronic book with access to the secondary virtual bookstore.

4. The system of claim 2 wherein the information services system further comprises a notice board server for sending messages from the primary virtual bookstore and/or the secondary virtual bookstore to a portable electronic book.

5. The system of claim 1 wherein the information services system further comprises a registration server for keeping track of the active state of the account associated with each portable electronic book in the system and for ensuring that each portable electronic book is associated with a primary virtual bookstore in the system.

6. The system of claim 1 wherein the information services system further comprises a centralized bookshelf associated with each portable electronic book, each centralized bookshelf storing all digital contents sent to and owned by the associated portable electronic book and allowing the associated portable electronic book to permanently delete any of said stored owned digital contents.

7. The system of claim 6 wherein the portable electronic book uploads a marked-up copy of the displayed digital content to the information services system, the uploaded marked-up copy being stored in the associated centralized bookshelf, the marked-up copy including marks and annotations made by a user of the portable electronic book.

8. The system of claim 6 wherein the portable electronic book downloads a copy of an owned digital content stored in the associated centralized bookshelf, the downloaded copy of the owned digital content being readable only by the portable electronic book.

9. The system of claim 6 wherein the authentication server generates a secret session key after authenticating the identity of the requesting portable electronic book, the secret session key being known only to the requesting portable electronic book, the primary virtual bookstore and the associated centralized bookshelf.

10. The system of claim 9 wherein each distinct digital content stored in the repository is encrypted with a unique content key.

11. The system of claim 1 wherein the information services system further comprises an Internet Services Provider for providing Internet network access to the portable electronic book.

12. The system of claim 1 wherein the portable electronic book includes a local personal library, the local personal library allowing the portable electronic book to display titles of all the digital contents owned by the portable electronic book while being off-line.

13. A method for electronically and securely distributing digital contents, the digital contents including textual, graphical and pictorial information, the method comprising:

selecting a digital content from a catalog of distinct digital contents using a portable electronic book, said catalog being included in a primary virtual bookstore, the primary virtual bookstore being a computer-based storefront accessible by the portable electronic book via a communications medium;

receiving the request from the portable electronic book at an information services system;

authenticating the identity of the requesting portable electronic book using an authentication server included in the information services system;

rendering the requested digital content sent to the requesting portable electronic book readable only by the requesting portable electronic book ensuring the digital content cannot be redistributed, using a copyright protection server included in the information services system; and sending the resulting requested digital content from a repository to the portable electronic book, the repository storing the distinct digital contents listed in the catalog;

receiving the sent digital content at the portable electronic book; and displaying the received digital content in readable form on a display screen of the portable electronic book.

14. A system for managing a business transaction involving digital contents comprising:

a distributor operated by a content vendor for distributing the digital contents to a user over a communication network:

a protection server operated by a business entity for providing protection services to the digital contents; and a viewing device operated by the user for accessing the digital contents distributed by the distributor, wherein the protection services ensure the digital contents are readable only by the viewing device and cannot be redistributed.

15. The system of claim 14 wherein the distributor comprises:

a repository for storing the digital contents.

16. The system of claim 15 wherein the protection server maintains a directory containing catalogs of the digital contents.

17. The system of claim 16 wherein the directory is accessible to the distributor and the user.

18. The system of claim 17 wherein the protection services include at least one of a copyright protection, an access security protection, a distribution protection, and a sale transaction protection.

19. The system of claim 18 wherein the business entity charges a processing fee to at least one of the content vendor and the user.

20. The system of claim 19 wherein the distributor is one of a primary distributor and a secondary distributor.

21. The system of claim 20 wherein the primary distributor has a predefined relationship with an aggregate of users with similar content needs.

22. The system of claim 21 wherein the secondary distributor has a relationship with a general installed base of users.

23. The system of claim 22 wherein the primary distributor maintains user account information.

24. The system of claim 22 wherein the primary distributor maintains a personal library of digital contents purchased by a user.

25. The system of claim 22 wherein the primary distributor maintains a local repository for storing personal documents forwarded to a user.

26. The system of claim 22 wherein the primary distributor charges an access fee to the users accessing the digital contents distributed by the primary distributor.

27. The system of claim 26 wherein the processing fee charged by the business entity to the primary distributor includes at least one of an operating fee, a licensing fee, and a maintenance fee for network access.

28. The system of claim 27 wherein the business entity provides toolkits to the content vendor.

29. The system of claim 28 wherein the toolkits include a distributor toolkit and a content conversion toolkit.

30. The system of claim 29 wherein the distributor toolkit includes modules to set up at least one of a storefront associated with the distributor, the repository, a billing system, and an access to the protection services.

31. The system of claim 30 wherein the content conversion toolkit includes at least a content generation module and an encryption module.

32. The system of claim 31 wherein the encryption module encrypts the digital contents with an encryption key sealed in a secure digital envelope using a public key owned by the business entity.

33. The system of claim 14 wherein the distributor is one of an electronic book press (EBP)-hosted bookstore and a third-party bookstore.

34. The system of claim 33 wherein the EBP-hosted bookstore is hosted by an EBP and administered by a bookstore licensee.

35. The system of claim 34 wherein the bookstore licensee is the EBP.

36. The system of claim 34 wherein the digital contents within the EBP-hosted bookstore are provided by the bookstore licensee.

37. The system of claim 36 wherein the bookstore licensee administers the EBP-hosted bookstore by performing at least one of content price setting, content adding, market promoting, and access controlling.

38. The system of claim 37 wherein the EBP receives content sales revenue from the EBP-hosted bookstore.

39. The system of claim 38 wherein the EBP pays a royalty to a copyright holder of a digital content sold by the EBP-hosted bookstore.

40. The system of claim 36 wherein the EBP performs billing for the bookstore licensee.

41. The system of claim 33 wherein the third-party bookstore is hosted and administered by a bookstore licensee.

42. The system of claim 41 wherein the bookstore licensee receives content sales revenue from the third-party bookstore.

43. The system of claim 42 wherein the bookstore licensee pays a license fee to the EBP.

* * * * *